United States Patent Office

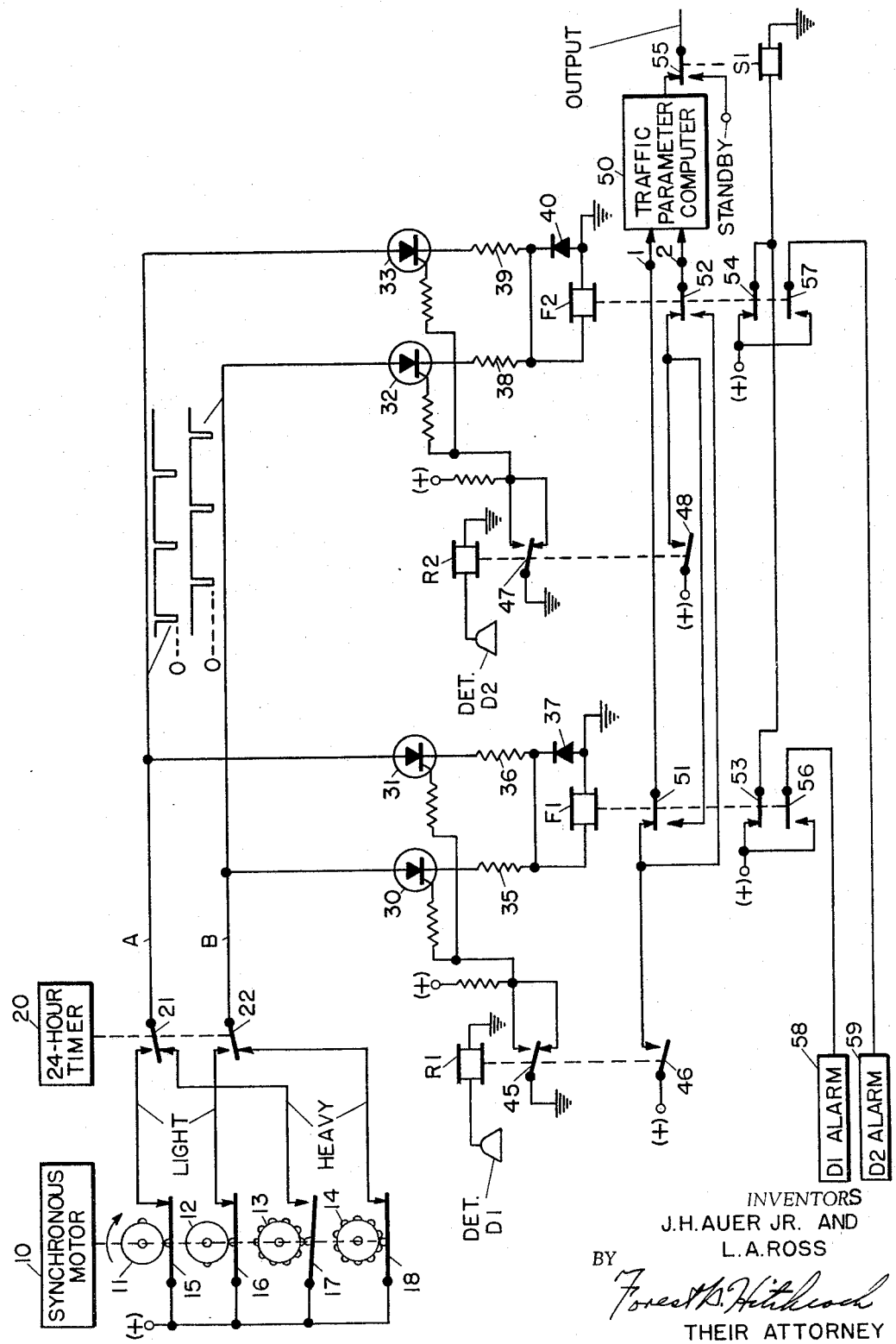

3,295,119
Patented Dec. 27, 1966

3,295,119
INACTIVITY SENSING CIRCUIT
John H. Auer, Jr., Fairport, and Lyle A. Ross, Rochester, N.Y., assignors to General Signal Corporation, Rochester, N.Y., a corporation of New York
Filed May 6, 1964, Ser. No. 365,446
11 Claims. (Cl. 340—214)

This invention relates to vehicle detector inactivity sensing systems, and more particularly to a system for indicating high probability of failure in a vehicle detector.

In traffic control systems relying upon vehicle detectors to supply computer inputs in order to accurately monitor or control traffic flow along a highway, there exists the possibility, however slight, that a vehicle detector has become inoperative. In such instance, data supplied to the computer becomes highly erroneous; consequently, the computer output also is erroneous. The invention herein disclosed is designed to detect such failures, in order to permit their immediate elimination from consideration by the computer.

The system is designed for operation in conjunction with presence detectors, such as the type disclosed in H. C. Kendall et al. Patent 3,042,303, issued July 3, 1962, although it may also be operated with any other type of vehicle detector. When used with presence-type detectors and apparatus responsive to the time intervals during which vehicles are sensed by such detectors, the system is particularly advantageous. For example, if a detector fails in the condition which indicates absence of a vehicle, no further vehicles are detected, and a traffic density or lane occupancy signal supplied therefrom falls to zero. However, if the detector fails in the condition which indicates presence of a vehicle, the detector supplied an indication that a vehicle is at a standstill within the detection zone; consequently, a traffic density or lane occupancy signal supplied therefrom rises to a maximum value. Yet, neither of these failures is distinguishable from the correct operation of a detector under extreme traffic conditions, since it is conceivable that zero or maximum traffic congestion actually exists. Thus, gross inaccuracies may occur in signals computed from such erroneous inputs. However, it is highly unlikely that such conditions would exist for extended periods of time. The present invention utilizes this fact in order to sense detector failures, and does so with a minimum of apparatus.

One object of this invention is to provide a system wherein inactivity of a vehicle detector for a predetermined interval measured by energy pulses is used as an indication of probable vehicle detector failure.

Another object is to provide a system utilizing repetitive out-of-phase pulses to control indications of probable vehicle detector failure.

Another object is to provide a reliable vehicle detector failure sensing circuit which permits monitoring of a plurality of vehicle detectors from a single circuit.

The invention contemplates timing means, first and second switching means receiving periodically interrupted energy from the timing means for alternately rendering the first and second switching means non-conductive upon each interruption, third switching means responsive to the first and second switching means, and means responsive to manifestations of monitored conditions. The first and second switching means are coupled to the means responsive to the manifestations and are rendered conductive in response to each of the manifestations, in order to maintain the third switching means energized. Deenergization of the third switching means produces a failure indication.

The foregoing and other objects and advantages of the invention will become apparent from the following detailed description when read in conjunction with the accompanying drawings in which the single figure is a schematic diagram of the system embodying the invention herein disclosed.

In the figure there is shown a synchronous motor 10 driving four cams 11, 12, 13 and 14. Cams 11 and 12 each have but one protuberance thereon, while cams 13 and 14 each have ten protuberances thereon. Cams 11 and 12 are mounted so that their protuberances are 180° out of phase. Similarly, cams 13 and 14 are mounted so that their protuberances are 18° out of phase. The protuberances on cams 11, 12, 13 and 14 momentarily open normally-closed contacts 15, 16, 17 and 18, respectively. A source of energy is coupled to the heels of contacts 15, 16, 17 and 18.

In addition, there is provided a 24 hour timer 20 having a pair of contacts 21 and 22. This timer is preferably programmed so that during hours of normally heavy traffic congestion, back contacts 21 and 22 are closed, while during hours of normally light traffic, front contacts 21 and 22 are closed. Front contacts 21 and 22 receive energy from contacts 15 and 16 respectively, while back contacts 21 and 22 receive energy from contacts 17 and 18 respectively. Output energy from the heel of contacts 21 is suppled to a lead A, while output energy from the heel of contacts 22 is supplied to a lead B.

A pair of detector repeater relays R1 and R2 are coupled to a pair of vehicle detectors D1 and D2, respectively. Each repeater relay is normally deenergized when the detector coupled thereto does not sense a vehicle, and is energized when the detector coupled thereto senses a vehicle. A first pair of controlled rectifiers 30 and 31 are provided for use with detector D1, while a second pair of controlled rectifiers 32 and 33 are provided for use with detector D2. Each controlled rectifier comprises a bistable switching device capable of assuming either a high or low impedance state; that is, either a non-conductive or conductive state, respectively.

The anodes of controlled rectifiers 30 and 32 are coupled to lead B, while the anodes of controlled rectifiers 31 and 33 are coupled to lead A. The cathodes of controlled rectifiers 30 and 31 are each coupled to one side of a failure detecting relay F1 through a pair of current-limiting resistors 35 and 36, respectively. Resistors 35 and 36 are also coupled to the cathode of a diode 37, the anode of which is coupled to the other side of relay F1. The anode of diode 37 is grounded. This diode functions to short-circuit high voltage transients produced when relay F1 is deenergized, thereby protecting controlled rectifiers 30 and 31 from burnout. In similar fashion, the cathodes of controlled rectifiers 32 and 33 are coupled to one side of failure detecting relay F2 through a pair of current-limiting resistors 38 and 39, respectively. Resistors 38 and 39 are also coupled to the cathode of a diode 40, the anode of which is coupled to the other side of relay F2. The anode of diode 40 is grounded. This diode protects controlled rectifiers 32 and 33 against burnout due to transient voltages induced by deenergization of relay F2.

The gating terminals of controlled rectifiers 30 and 31 are both resistively coupled to front and back contacts 45 of relay R1, and to a source of positive bias. The heel of contact 45 is grounded. In similar fashion, the gating terminals of controlled rectifiers 32 and 33 are both resistively coupled to front and back contact 47 of relay R2, and to a source of positive bias. The heel of contact 47 is grounded.

A traffic parameter computer 50, which may, for example, comprise any one of many well-known traffic computing circuits, is provided. This computer has a first input 1 energized through a front contact 46 of relay R1 and a front contact 51 of relay F1 in series, and a second input 2 energized through a front contact 48 of relay R2 and a front contact 52 of relay F2 in series. In addition, back contact 52 of relay F2 receives energy from front contact 46 of relay R1, while back contact 51 receives energy from front contact 48 of relay R2.

Output from computer 50 is controlled by a relay S1 having a front and back contact 55. Thus, when relay S1 is energized, output from computer 50 is supplied through front contact 55. However, when relay S1 is deenergized, indicating failure of all detectors supplying inputs to the computer, output is instead supplied from a standby reference voltage through back contact 55. This relay is energized in parallel from a pair of front contacts 53 and 54 of relays F1 and F2, respectively. Hence, deenergization of both relays F1 and F2 is required, in order to deenergize relay S1 and supply a standby output.

A pair of detector alarms 58 and 59 are also provided. These alarms are energized respectively from a back contact 57 of relay F2, for indicating a failure of detectors D1 and D2, respectively.

In operation, assume timer 20 closes its front contacts 21 and 22, thereby operating on the presumption that traffic is light during this particular time. Leads A and B are thus energized, except at those instants during which cam 11 opens contact 15 and cam 12 opens contact 16. Hence, steady energization exists on leads A and B, except for the aforementioned interruptions which occur out of phase with each other but at identical repetition rates, as illustrated by the accompanying voltage waveform for leads A and B.

It is noted that the controlled rectifiers are of the type which become conductive when positive energy is supplied to the gating terminal. Moreover, once they become conductive, the conduction continues even after removal of the positive gating energy. Conduction can be stopped only by removal of anode energy, as occurs periodically on leads A and B. Thus, each time detector repeater relay R1 changes position in response to detection of arrival or departure of a vehicle by detector D1, a positive voltage pulse is supplied to the gating terminals of controlled rectifiers 30 and 31. This pulse occurs as a result of removal of ground from the gating circuits during the relay crossover time. At this instant, both controlled rectifiers 30 and 31 become conductive, and relay F1 is energized.

Now assume a momentary removal of energy from lead A occurs, resulting in loss of conduction by controlled rectifier 31. The current through controlled rectifier 30, however, is sufficient to maintain relay F1 energized. If a change in position of relay R1 occurs before subsequent removal of energy from lead B, then both controlled rectifiers 30 and 31 again become conductive prior to the time that controlled rectifier 31 becomes non-conductive. Consequently, relay F1 remains energized.

However, if no change in position of relay R1 occurs for a sufficiently long time, it is possible for controlled rectifier 31 to become extinguished before controlled rectifier 30 has been returned to its conductive state. At that time, both controlled rectifiers 30 and 31 are non-conductive, causing relay F1 to deenergize. This closes back contact 51 replacing signals supplied by detector D1 to the first input of computer 50, with signals supplied by detector D2. The computer thereupon provides a more accurate output then it otherwise would if detector D1, though totally inoperative, remained coupled to the first input of the computer. In addition, detector D1 failure alarm 58 is actuated.

The circuit associated with detector D2 operates in exactly the same manner as the circuit associated with detector D1. A failure of detector D2 eventually deenergizes relay F2, permitting vehicle detection signals produced by detector D1 to be coupled through back contact 52 to the second input of computer 50, again causing the computer to supply a more realistic output. In addition, detector D2 failure alarm 59 is actuated.

In the event both relays F1 and F2 should fail, front contacts 53 and 54 are both opened, deenergizing standby relay S1. This opens front contact 55, removing signals produced by computer 50 from the output of the system, and closes back contact 55, thereby coupling the predetermined standby reference voltage to the output of the system instead. In this fashion, total failure of all detectors in the system may be obviated by substituting an arbitrary parameter for the output of computer 50.

The rate at which pulses are supplied to leads A and B is controlled as a function of the time of day, so that rapid detection of failure may be obtained during normally heavy traffic hours. During normally light traffic hours, a lower pulse repetition rate on leads A and B is used, in order to avoid an unduly large possibility of false alarms. Although a 10 to 1 ratio of pulse repetition rate between periods of heavy and light traffic conditions is shown in the embodiment herein disclosed, it is clear that any other suitable ratio may be used in the alternative. Operation of the system under heavy traffic conditions is identical to operation under light traffic conditions as already described, with the exception that back contacts 21 and 22 are closed, instead of front contacts 21 and 22. Hence, an increased pulse repetition rate is supplied to leads A and B. Moreover, it should be noted that the first operation of a detector repeater relay following a period of inactivity, such as occurs after an inoperative detector is repaired, results in conduction of both controlled rectifiers and reenergization of the detector failure relay.

Thus, there has been shown a detector inactivity sensing system utilizing a minimum number of components. The system is not limited to operation of but two detectors; a large number of detectors may be monitored by the same system. The system, moreover, is highly flexible, in that it may be programmed for normally-expected variations in traffic conditions throughout the day.

Although but one embodiment of the invention has been described, it is to be specifically understood that this form is selected to facilitate in disclosure of the invention rather than to limit the number of forms which it may assume; various modifications and adaptations may be applied to the specific form shown to meet requirements of practice, without in any manner departing from the spirit or scope of the invention. For example, the system may also be operated with detectors monitoring objects other than vehicles, as, for example, objects moving along an assembly line.

What is claimed is:

1. A vehicle detector inactivity sensing system comprising, timing means, first and second switching means, each said switching means being capable of assuming a high or low impedance state, means coupling periodically interrupted energy from the timing means to the first and second switching means respectively at spaced intervals for causing each said switching means to assume a high impedance state upon interruption of the energy respectively supplied thereto, third switching means responsive to the first and second switching means and capable of being energized by either of said first and second switching means, vehicle detector means responsive to manifestations of monitored traffic conditions, and means coupling said vehicle detector means to the first and second switching means for operating said first and second switching means to low impedance states in response to each of said manifestations.

2. A detector failure sensing system comprising, timing means producing two regularly interrupted output voltages, said interrupted voltages being interrupted at different times, first and second switching means, each said switching means having input, output and gating terminals, means coupling one of said interrupted voltages to the input terminal of the first switching means, means coupling the other of said interrupted voltages to the input terminal of the second switching means, third switching means coupled to the output terminals of said first and second switching means, means coupling a bias voltage to the gating terminals of said first and second switching means, fourth switching means operable to one of two states in response to manifestations of monitored conditions, and means coupling said fourth switching means to said bias voltage for short-circuiting said bias voltage throughout intervals of quiescent monitored conditions.

3. The detector failure system of claim 2 wherein said first and second switching means comprise controlled rectifiers.

4. The detector failure sensing system of claim 3 wherein said third and fourth switching means comprise relays.

5. A detector failure sensing system comprising, timing means producing first and second output voltages which are alternately interrupted at identical repetition rates and opposite phases, first and second controlled rectifiers, each said rectifier having an anode, cathode and gating terminal, means coupling the first output voltage to the anode terminal of the first controlled rectifier, means coupling the second output voltage to the anode terminal of the second controlled rectifier, switching means coupled to the cathode terminals of the first and second controlled rectifiers, means coupling a bias voltage to the gating terminals of the first and second controlled rectifiers, relay means operable to an energized or deenergized condition in response to manifestations of monitored conditions, and means coupling the relay means to said gating terminals for short-circuiting said bias voltage whenever the relay means is energized or deenergized.

6. The dectector failure sensing system of claim 5 wherein said timing means comprises, a voltage source, a plurality of switching means operating at a plurality of repetition rates, and timer means for coupling said voltage source to a selected one of said plurality of switching means in accordance with a predetermined program.

7. The detector failure sensing system of claim 5 wherein said timing means comprises, a voltage source, a plurality of pairs of switching means, one of the switching means for each pair operating at a repetition rate identical to the repetition rate of the other switching means in said pair but at an opposite phase relationship thereto, and timer means for coupling said voltage source to one of said pairs in accordance with a predetermined program.

8. A detector failure sensing system comprising, means generating two series of pretimed energy pulses, said pulses of each series being out of phase with the pulses of the other series, means for supplying a failure indication, first and second switching means coupling said generating means to said indication means whereby said indication means denotes normal operation whenever at least one of said first and second switching means is in a conductive condition, third switching means responsive to manifestations of monitored conditions, and means coupling said third switching means to said first and second switching means for operating said first and second switching means to a conductive condition in response to each of said manifestations.

9. A detector failure sensing system comprising, means generating pulsating direct currents on each of two outputs at a common repetition rate and opposite phase, first bistable circuit means coupled to one of said outputs, second bistable circuit means coupled to the other of said outputs, switching means coupled to the first and second bistable circuit means and actuated whenever either or both said bistable circuit means are in a conductive condition, means responsive to manifestations of monitored conditions, and means coupling said responsive means to said first and second bistable circuit means for simultaneously operating both of said first and second bistable circuit means to a conductive condition in response to each of said manifestations.

10. A vehicle detector inactivity sensing system comprising, timing means, first, second, third and fourth switching means, each said switching means being capable of assuming a high or low impedance state, means coupling periodically interrupted energy from the timing means to the first, second, third and fourth switching means for causing each said switching means to assume a high impedance state upon interruption of the energy respectively supplied thereto, fifth switching means responsive to the first and second switching means and capable of being energized by either of said first and second switching means, sixth switching means responsive to the third and fourth switching means and capable of being energized by either of said third and fourth switching means, first and second vehicle detector means responsive to manifestations of monitored traffic conditions, means coupling said first vehicle detector means to the first and second switching means, means coupling said second vehicle detector means to the third and fourth switching means, utilization means including first and second inputs, said fifth switching means coupling said first vehicle detector means to said first input, said sixth switching means coupling said second vehicle detector means to said second input, and circuit means coupling said fifth switching means to said sixth switching means whereby either of said first and second vehicle detector means provides energy to said first and second inputs upon failure of the other of said first and second vehicle detector means.

11. A detector failure sensing system comprising, timing means producing recurring time intervals of predetermined length, a first detector normally quiescent but rendered active during the presence of an object, a second detector normally quiescent but rendered active during the presence of an object, checking means normally maintained active but controlled by said timing means momentarily to become inactive at the end of each said time interval of said predetermined length, means controlled by said first detector when rendered active during said time interval to prevent said checking means from becoming inactive, and computer means controlled by said first detector to record the presence of each object sensed by said first detector only if said checking means is then active, and means for shifting said computer means to control by said second detector in the event said checking means becomes inactive.

References Cited by the Examiner
UNITED STATES PATENTS

| 2,448,113 | 8/1948 | Olafson | 340—37 |
| 2,603,703 | 7/1952 | Range et al. | 340—37 |
| 3,072,883 | 1/1963 | Hendricks et al. | 340—41 X |

NEIL C. READ, *Primary Examiner.*

R. M. ANGUS, D. YUSKO, *Assistant Examiners.*